J. L. & E. SCOTT.
FRICTION DRIVEN DROP HAMMER.
APPLICATION FILED JUNE 9, 1917.

1,242,052.

Patented Oct. 2, 1917.
5 SHEETS—SHEET 1.

INVENTORS
James Livesey Scott
Ernest Scott
BY
ATTORNEYS

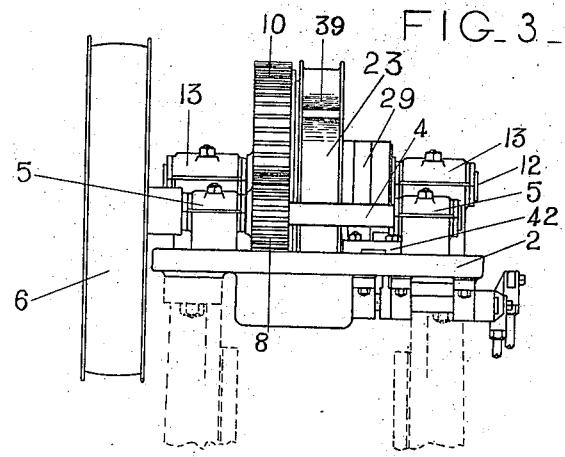
FIG_3_
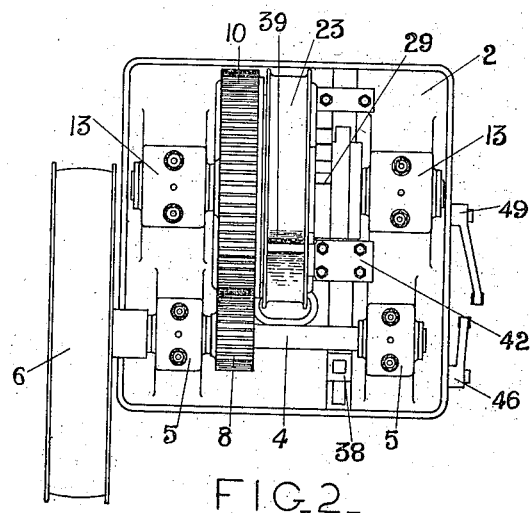
FIG_2_

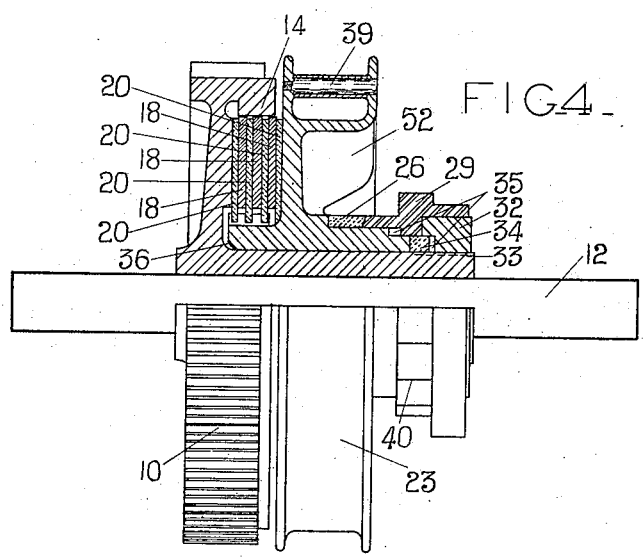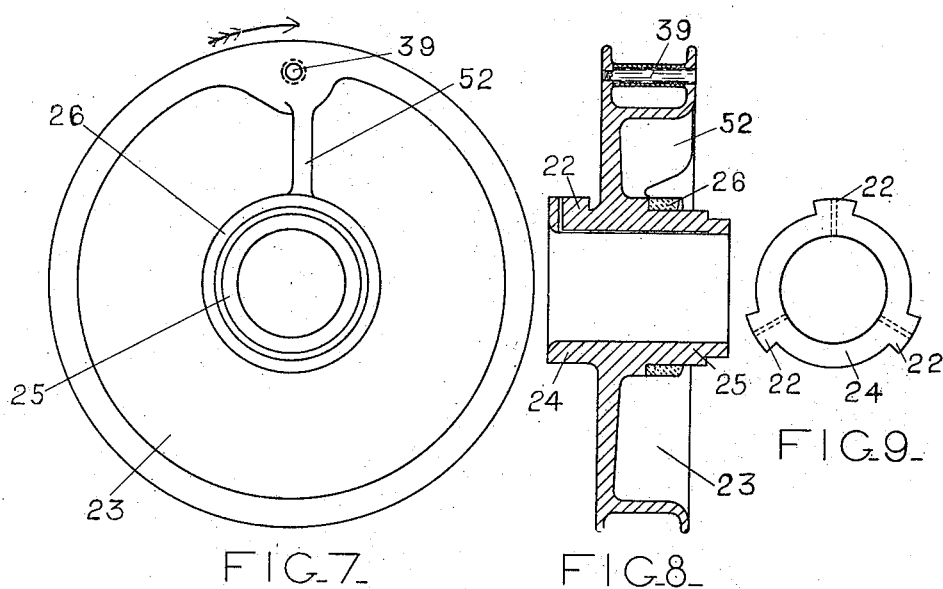

J. L. & E. SCOTT.
FRICTION DRIVEN DROP HAMMER.
APPLICATION FILED JUNE 9, 1917.

1,242,052.

Patented Oct. 2, 1917.
5 SHEETS—SHEET 4.

INVENTORS
James Livesey Scott
Ernest Scott
BY
ATTORNEYS

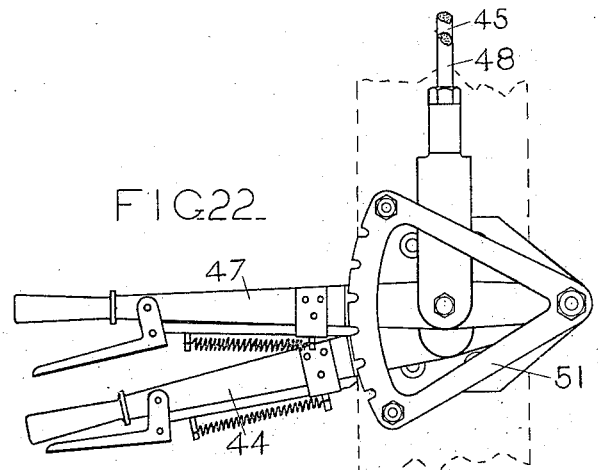
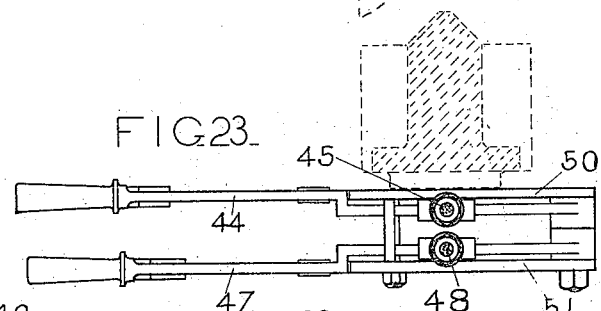
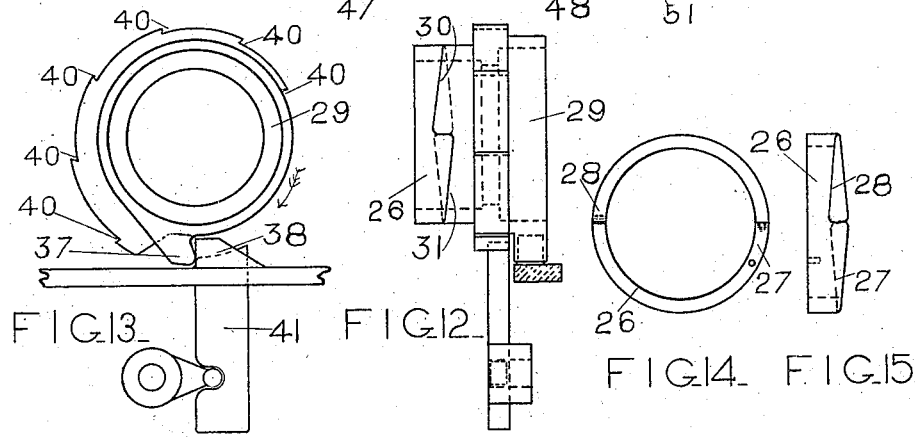

UNITED STATES PATENT OFFICE.

JAMES LIVESEY SCOTT AND ERNEST SCOTT, OF FOOTSCRAY, VICTORIA, AUSTRALIA.

FRICTION-DRIVEN DROP-HAMMER.

1,242,052.    Specification of Letters Patent.    Patented Oct. 2, 1917.

Application filed June 9, 1917. Serial No. 173,840.

*To all whom it may concern:*

Be it known that we, JAMES LIVESEY SCOTT and ERNEST SCOTT, engineers, subjects of the King of Great Britain, both residing at No. 22 Raleigh street, Footscray, in the State of Victoria, Commonwealth of Australia, have invented certain new and useful Improvements Relating to Friction - Driven Drop-Hammers, of which the following is a specification.

This invention is for the purpose of lifting, releasing and lowering the hammer head or tup of a drop hammer by frictional mechanism. It relates to devices and mechanism adapted and applied for such purpose and to enabling drop hammers to be actuated by inclosed frictional plates. It also has for an object to obviate the necessity of adjusting the length of stroke of a drop hammer by manual labor. Another object is to dispense with revolving levers, arms, sliding dog clutches and shoes or lifting rollers. Another object is to overcome the fundamental defects of a drop hammer occurring when adopting exposed and unbalanced parts. Other objects and advantages will be in part obvious and in part pointed out hereinafter. The invention comprises a special platform having bearings positioned to carry a driving shaft and pinion in such positions and adapted so to act that the lifting force through the pinion, spur wheel, lifter pulley and other parts shall be direct with the lift. The friction plates are inclosed by overhanging rim of spur wheel and the side of the lifter pulley so that dirt or other obstructions are effectively and continuously excluded.

One embodiment of the invention is shown in accompanying drawings in which:

Fig. 2 is a plan and Fig. 3 a side elevation of mechanism constituting the invention.

Fig. 4 is a plan and half-section of principal parts.

Fig. 7 is a side elevation of lifter pulley and Fig. 8 is a section of same.

Fig. 9 is an end view of boss at one side of lifter pulley.

Figure 10:
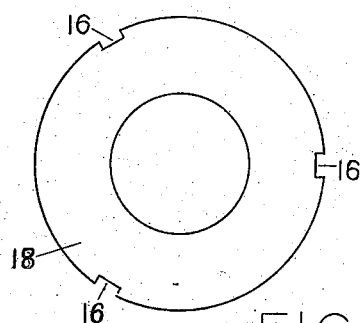
Figure 6:
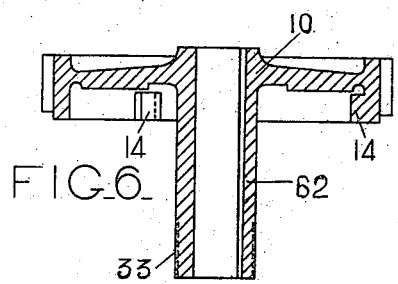
Figure 11:
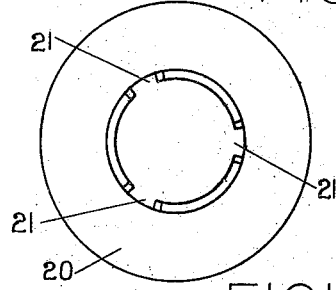

Figs. 10 and 11 show the friction plates 18 and 20.

Figs. 12, 13, 14 and 15 show the collars 26 and 29, and parts connected therewith.

Figure 16:
Figure 17:
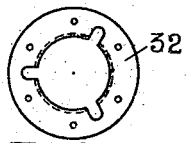

Figs. 16 and 17 show details of collar 32.

Figure 19:
Figure 18:
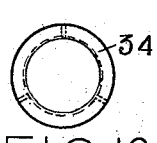

Figs. 18 and 19 show details of collar 34.

Figure 21:
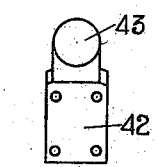
Figure 20:
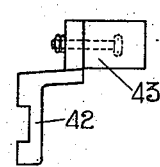

Figs. 20 and 21 show the bracket and buffer.

Figs. 22 and 23 show levers and quadrants for raising and releasing the hammer.

The mechanism of the invention is mainly placed upon the platform 2 constructed in such manner as to carry driving shaft 4 in bearings 5 worked from pulley 6 and pinion 8 gearing into spur wheel 10 carried by shaft 12 in bearings 13. The inner overhanging surface of the spur wheel has projections 14 engaging into recesses 16 of three driving friction plates 18. Against the friction plates 18 are arranged four intervening plates 20. The surfaces of the two sets of plates are brought into contact as and when hereinafter described. The plates 20 have on their inner periphery recesses 21 which engage projections 22 on the boss of the lifter pulley 23 thereby in operation imparting motion to the same.

The lifter pulley 23 has on one side a boss 24 carrying the projections 22 which engage the recesses 21. On the other side of the lifter pulley is another boss 25 of such shape and length as to receive rings and collars hereinafter described. The lifter pulley is mounted and running loose upon a specially extended boss 62 of the spur wheel.

The collar 26 secured to lifter pulley is provided with curved or spiral (hereinafter called curved) surfaces 27, 28 corresponding with curved surfaces 30, 31 on collar 29. This collar 29 is free to rotate or oscillate backward and forward and to slide laterally. The curved surfaces of collars 26 and 29 when pressed together decrease the distance laterally between two given points on these collars.

In operation the rotation of the collar 29 in the direction of the spur wheel's rotation brings the curved surfaces of the two collars together sliding the lifter pulley laterally with its friction plates against the other friction plates, thus imparting motion to the lifter pulley.

An adjusting collar 32 screwably fitted on to the thread 33 of boss on the spur wheel allows the collar 29 to be adjusted in its lateral position and thus to govern the closeness of the friction plates to each other.

Another collar 34 is secured upon the thread 33 for the purpose of limiting the lateral sliding motion of the lifter pulley. 35 represents the space to allow adjusting collar to operate. 36 represents the space to allow for variation consequent upon the thickness of the friction plates.

The devices will now be described for placing the foregoing in or out of operation.

The collar 29 has upon its periphery a projection 37 placed so as to come in contact or catch upon the horizontal slide 38 which prevents any further rotation of the collar and presses it the reverse way thus bringing the curved surfaces of both collars 26 and 29 together and thus pressing the friction plates 20 against the friction plates 18 causing the lifter pulley to rotate in the direction required. It is obvious that the rope or other attachment 54 secured to pin 39 near the periphery of the lifter pulley 23 will by such rotation in the direction shown by the arrow, raise the hammer.

On another portion of collar 29 are a number of steps 40 for the purpose of being engaged by a vertical plunger 41. The steps are formed at different distances from the center. Whenever the vertical plunger 41 engages one of the steps it stops the rotation of collar 29 separates the curved surfaces and the friction plates leaving the lifter pulley free to rotate in the opposite direction and allowing the hammer to fall to the anvil. If the plunger is raised a lesser distance it engages a step which gives the hammer the longer fall and if the plunger is raised a greater distance it engages a step which gives the hammer a shorter fall.

A bracket 42 with stop buffer 43 of resilient material is positioned on the platform for the purpose of stopping the momentum of the lifter pulley 23 on the fall of the hammer, a projection 52 of suitable form and shape being provided on the lifter pulley to correspond with the buffer 43.

A lever and quadrant is provided to raise the hammer and another to release the hammer. The lever 44, rod 45 and arm 46 serve in raising the lever to bring the slide stop 38 against the projection 37 on collar 29 thus causing the collar to rotate in the direction of the arrow, press the friction plates together, and cause the lifting of the hammer.

The lever 47 rod 48 and arm 49 serve on raising the lever to raise the plunger 41 thus bringing its nose into contact with one or other of the steps 40 and consequently releasing the collars and friction plates and allowing the hammer to fall. The extent of fall is regulated by the degree of elevation of the plunger. The levers are fitted and act with quadrants 50, 51 as will be well understood.

In operating the invention the starting lever 44 being set for motion brings into lateral contact the driving friction plates 18 on the spur wheel and the driven friction plates 20 on the lifter pulley. The starting slide 38 pressing against the projection 37 of the loose collar causes a partial revolution thereof in the direction of the arrow, which has the effect of bringing together the curved surfaces and also the two sets of friction plates and thus raising the hammer.

At the desired period or position when it is desired to let fall the hammer, this is effected by means of raising the vertical plunger 41 operated by lever 47. On being thus operated the said plunger comes in contact with lugs or steps 40 on the periphery of the collar. These are so positioned and proportioned that a drop of greater or less height is obtained according to desire. The plunger is raised to a greater or less extent accordingly. On coming into contact with one or other of the projections named, the effect is that the curved surfaces on the collars are released and consequently the friction plates and thus the lifter pulley will run free and the hammer falls.

Figure 1:
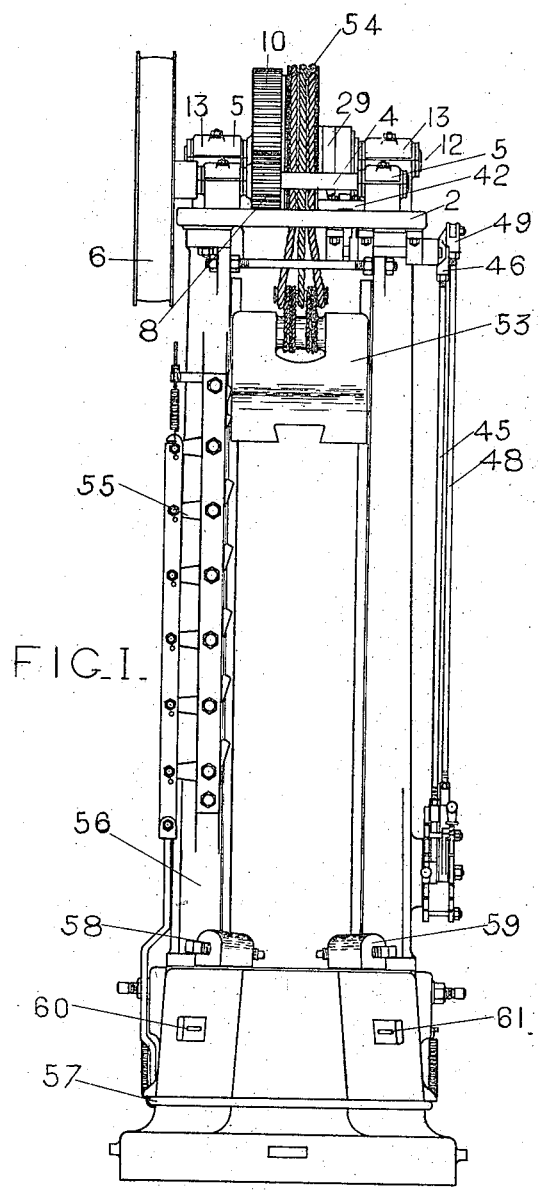
Figure 1 is a view in elevation of the platform and mechanism mounted upon the usual frame.
Figure 5:
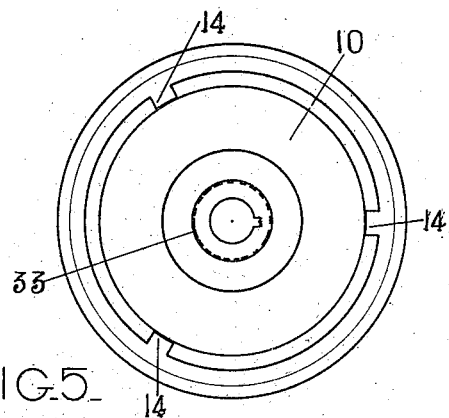
Fig. 5 is a side elevation and Fig. 6 a section of spur wheel.

The representation in Fig. 1 shows pawls 55 on the front of the pillar 56 operated by treadle 57 for holding up the hammer when not in use at any desired position, also puppets 58, 59 and cotters 60, 61 for securing the die in required position. These however form no part of the present invention.

We claim:—

1. In a drop hammer mechanism including a hammer, a spur wheel and an oscillating or partially rotating lifter pulley carrying said hammer, clutch mechanism mounted between said wheel and pulley, a collar fixed on said pulley and a loose oscillatory collar also mounted on said pulley, each collar having mating spiral curved surfaces, and means for retarding oscillation of said oscillatory collar in either direction, to cause lateral movement thereof whereby the clutch mechanism is rendered active or passive to raise or lower the hammer.

2. In a drop hammer mechanism including a frame, a shaft thereon, and hammer, a spur wheel fixed on said shaft and having an overhanging rim, an oscillatory or partially rotatable lifter pulley mounted on the hub of said spur wheel, connecting means between the hammer and said lifter pulley, clutching means mounted between the lifter pulley and the overhanging rim of the spur wheel, means for oscillating or partially rotating said lifter pulley and putting the clutching means into operative action to lift the hammer, and means for releasing said clutching means to drop the hammer.

3. In a drop hammer mechanism including a hammer, a spur wheel and an oscillating or partially rotating lifter pulley having an extended boss, clutching means mounted between the spur wheel and the lifter pulley, a collar fixed on the boss of the lifter pulley, an oscillatory collar also mounted on said boss and adapted to move laterally, the adjacent faces of said collars having corresponding cam surfaces, a projection carried by the loose collar, a slide stop adapted to engage said projection and means for moving said stop into the path of said projection whereby the said clutching means couple the spur wheel and lifter pulley to raise the hammer.

4. In a drop hammer mechanism including a hammer, a spur wheel and an oscillating or partially rotating lifter pulley, said pulley having its hub extended to form a boss, clutching means mounted between said spur wheel and lifter pulley, a collar fixed on said lifter pulley, another collar mounted to oscillate on said pulley and laterally movable on said boss adjacent to the fixed collar, the adjacent faces of said collars having corresponding cam surfaces, means carried by said oscillatory collar for retarding its oscillation, step means carried by said collar to cause the hammer to drop from different heights, and means for engaging said step means for causing operation of same, substantially as and for the purpose described.

5. In a drop hammer mechanism including a hammer, a spur gear and a lifter pulley, means for causing frictional clutching action between said gear and pulley, a rigid, and an oscillatory collar mounted on the lifter pulley and having mating cam meeting edges, means for retarding oscillation of the loose collar in one direction to cause lateral movement of the collar to cause the clutching action, step means carried by the loose collar whereby the hammer is carried to different heights and dropped therefrom, a plunger for engaging said step means and means for raising and lowering said plunger.

6. In a drop hammer mechanism including a hammer, a spur gear and a lifter pulley, means for frictionally clutching the same together, a fixed and a loose collar, carried by said pulley and having mating cam meeting faces, means for oscillating the loose collar to cause lateral movement thereof, and an adjustable stop collar carried by the lifter pulley, to regulate the distance between the aforesaid cam meeting faces, and to take up lateral thrust when the spur gear and pulley are frictionally clutched together.

7. In a drop hammer mechanism including a spur gear having a tubular hub, and a lifter pulley mounted to oscillate and slide laterally on said hub, clutching means between the gear wheel and lifter pulley actuated by the sliding motion of the pulley, and a collar mounted on said hub to limit the lateral sliding motion of the lifter pulley.

8. In a drop hammer mechanism including a hammer, a frame and a spur gear, and lifter pulley carried on said frame, clutching means between said spur gear and side of the lifter pulley, means for putting said clutching means into action and cause oscillation of the lifter pulley, a buffer carried on said frame and a projection carried by the lifter pulley whereby the momentum of the lifter pulley may be stopped subsequent to its oscillation on the fall of the hammer.

9. In a drop hammer mechanism including a hammer, a spur wheel and an oscillatory lifter pulley having an extended boss, clutching means mounted between the spur wheel and the oscillatory pulley, a collar fixed on said boss, an oscillatory collar also mounted on said boss and adapted to move laterally thereon, the adjacent faces of said collars having corresponding cam surfaces, a projection carried by the osillatory collar, a movable stop adapted to engage said projection, and means for moving said stop into the path of said projection, whereby the said clutching means couple the spur wheel and oscillatory pulley to raise the hammer.

10. In a drop hammer mechanism including a hammer, a spur wheel and an oscillating or partially rotating lifter pulley, said pulley having its hub extended to form a boss, clutching means mounted between said spur wheel and lifter pulley, a collar fixed on said lifter pulley, another collar mounted to oscillate on said pulley and laterally movable on said boss adjacent to the fixed collar, the adjacent faces of said collars having corresponding cam surfaces, means carried by said oscillatory collar for retarding its oscillation, graduated step means carried by said oscillatory collar to cause the hammer to drop from different heights, and means for engaging said graduated step means for causing operation of the same, substantially as and for the purpose described.

Signed by the said JAMES LIVESEY SCOTT and ERNEST SCOTT, at Melbourne, Victoria, Australia, this 30th day of September A. D. 1916.

JAMES LIVESEY SCOTT.
ERNEST SCOTT.

In the presence of—
CHARLES NICHOLAS COLLISON,
DAISY WILLIAMS.